Figure 2A:
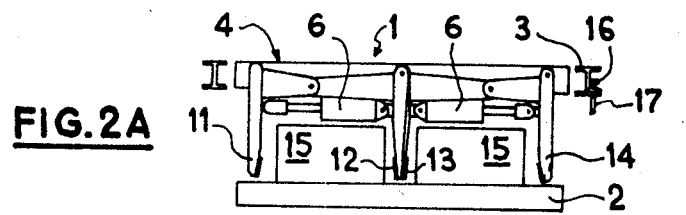

United States Patent [19]

Minato

[11] 4,284,381
[45] Aug. 18, 1981

[54] METHOD AND APPARATUS FOR STACKING BLOCKS TO FORM A PALLET HAVING PREDETERMINED SPACES THEREIN

[75] Inventor: Andre H. Minato, Fouquerolles Bresles, France

[73] Assignee: Societe d'Exploitation des Establissements Minato S.O.D.E.E.M., Fouquerolles Bresles, France

[21] Appl. No.: 8,802

[22] Filed: Feb. 1, 1979

[30] Foreign Application Priority Data

Jul. 28, 1978 [FR] France ............................ 78 22505

[51] Int. Cl.³ ............................................. B65G 57/26
[52] U.S. Cl. ...................................... 414/61; 198/459; 414/750; 414/751
[58] Field of Search ...................... 414/32, 33, 34, 60, 414/61, 750, 751, 753; 294/63 R, 63 A; 198/459

[56] References Cited

U.S. PATENT DOCUMENTS

| | | | |
|---|---|---|---|
| 3,241,688 | 3/1966 | Laird et al. | 414/33 X |
| 3,471,036 | 10/1969 | Thomas et al. | 414/61 |
| 3,887,060 | 6/1975 | Kamphues | 414/60 X |
| 3,892,318 | 7/1975 | Berndt et al. | 414/32 |
| 3,905,489 | 9/1975 | Berndt et al. | 414/32 |
| 4,040,532 | 8/1977 | Pearne et al. | 414/61 |

Primary Examiner—Leslie J. Paperner
Attorney, Agent, or Firm—Seidel, Gonda, Goldhammer & Panitch

[57] ABSTRACT

Apparatus for automatic packaging of products such as concrete blocks in pallets formed by stacking layers of the blocks including a fixed table having supports along its sides and a moveable carriage disposed above the table on guide rails. The carriage is slideable having a translatory movement along the rails and carries gripping members for holding and releasing the blocks so as to move the blocks to form reserved spaces in the pallet for the tongs of a pallet handling device. The reserved spaces are formed in a given layer of the blocks in the pallet by causing the gripping members to hold and release the blocks in cooperation with detection and spacing devices for forming a given number of reserved spaces in the desired layer of blocks. The reserved spaces are created in a layer of blocks during the continuous movement of the carriage in the same direction.

8 Claims, 10 Drawing Figures

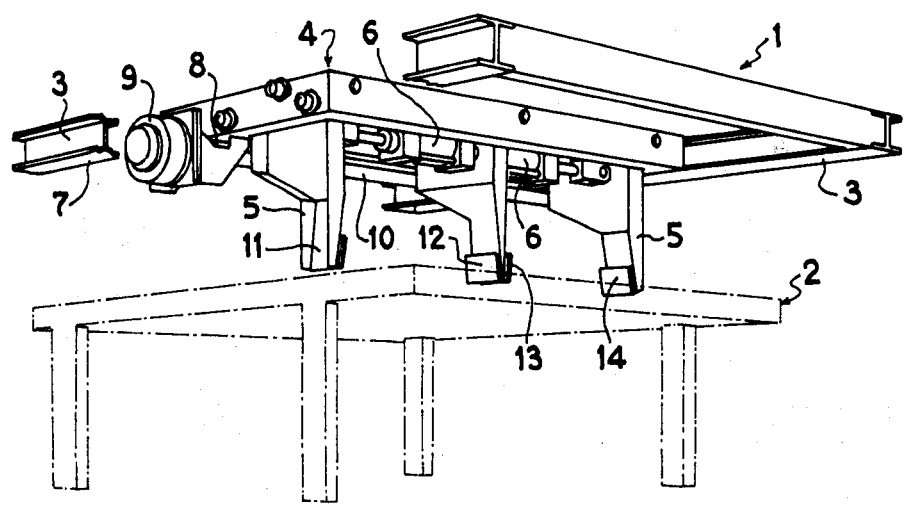
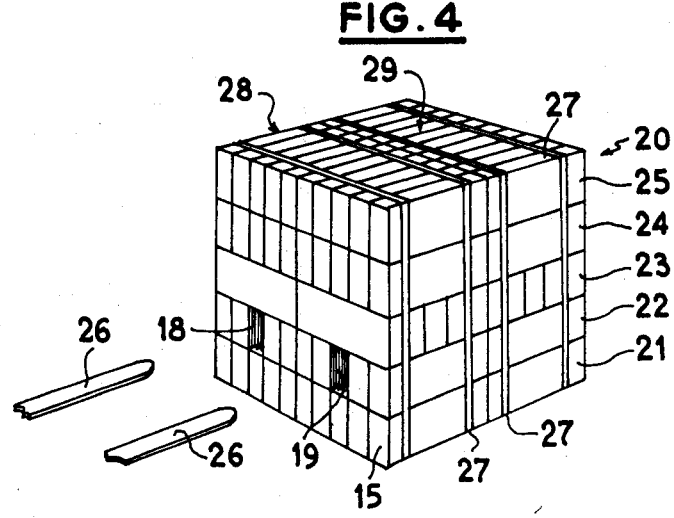

METHOD AND APPARATUS FOR STACKING BLOCKS TO FORM A PALLET HAVING PREDETERMINED SPACES THEREIN

The present invention concerns a process and apparatus for automatic packaging of products such as concrete blocks or the like, for making pallets of products and the pallets of products which are produced in this way.

Processes and apparatus for automatically packaging products at the output of casting stations, for making pallets, are already known.

However, these conventional processes and apparatus require the use of a certain number of working stations such as wrapping stations and pallet stores, which various working stations are connected together by transfer belts, to form pallets of products.

The conventional processes and apparatus are of very high cost for packaging products in the form of pallets (upkeep of pallets, maintenance and repair).

Moreover, the pallets of products which are produced by using the conventional processes and apparatus are of relatively high cost because they usually comprise a support member which forms the base, the support member being necessary for subsequently permitting the pallet to be transported by means of a lift truck; the conventional pallets also generally comprise a wrapping such as a plastics cover which also increases the cost price of the pallet.

The aim of the present invention is to overcome these disadvantages, and the invention therefore seeks to provide a process and apparatus for automatic packaging of products such as concrete blocks, which are of a simple design, easy to use for forming pallets of low cost price, and capable of being easily handled.

For this purpose, the invention concerns apparatus for automatic packaging of products such as concrete blocks, for making pallets, formed by layers of products, characterised in that it comprises a fixed receiving table, a support structure on respective sides of the table, said structure being provided with guide rails in its upper part, a movable carriage which is slidable with a translatory movement in the guide rails and which carries gripping members for gripping the products which are disposed successively and in layers on the table, and detection means co-operating with a control device for causing the gripping members to grip on and release the products to be packaged, in order to define reserved spaces in a given layer of products.

During a working cycle, this apparatus makes it possible to produce spacings between the concrete articles which are disposed in layers and which are arranged successively, the spacings corresponding to reserved spaces which subsequently permit the engagement therein of the fork arms of a lift truck when the pallet has been finally completed.

In accordance with another feature of the invention, the carriage advances continuously during a working cycle comprising forming a given number of reserved spaces for a given layer of products.

In accordance with another feature of the invention, the guide rails are provided with a toothed rack in which there engages a pinion which is driven in rotation by a motor and carried by a shaft fixed with respect to the movable carriage, to drive the carriage in translation.

In accordance with another feature of the invention, the gripping members comprise tongs members which move apart and which grip on to the products disposed on the table, under the action of jacks controlled by the detection means.

In accordance with another feature of the invention, cams are mounted on the guide rails and co-operate with the detection means which are fixed with respect to the movable carriage, for controlling the commencement of the gripping and release operations of the tongs members on the products, in order to produce predetermined spaces between the rows of products corresponding to the reserved spaces.

The present invention also concerns a process for the automatic packaging of products such as concrete blocks or the like, in order to form pallets provided with reserved spaces for receiving the fork arms of a lift truck, characterised in that:

the concrete blocks are disposed successively and in layers on the fixed table, the number of reserved spaces in a given layer of concrete blocks is determined by mounting a number of cams on the guide rails, corresponding to the number of spaces desired, the dimension of each pair of cams is adjusted to determine the length of the desired spaces, the translatory movement of the movable carriage is controlled for it to perform a working cycle on a given layer of concrete blocks, the different layers of concrete blocks are stacked to form a stack, and the stack of concrete blocks is hooped to form a pallet of products.

This process makes it possible rapidly to produce a pallet without a support member. Holding tongs member take up the successive layers in order to stack them to form a pallet. The operating cycle of the apparatus which makes it possible to form a layer comprising reserved spaces is performed every third, fourth, fifth or sixth layer intended to form the pallet, depending on the requirements or the wishes of the user.

Finally, the invention concerns a pallet of products such as concrete blocks or the like, characterised in that it is provided with reserved spaces in a given layer, for receiving the fork arms of a lift truck.

This pallet is very simple in design and easy to handle. It is of an advantageous cost price, insofar as it does not comprise either a base plate or a specific wrapping cover.

Figure 2B:
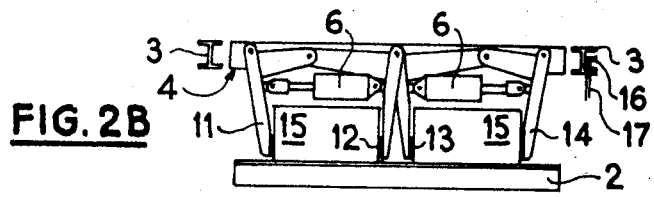

The present invention will be better appreciated by means of an embodiment of apparatus according to the invention, for carrying out the process for making pallets provided with reserved spaces, as shown diagrammatically by way of nonlimiting example in the accompanying drawings in which:

FIG. 1 is a perspective view of part of the apparatus according to the invention, FIG. 2A is a front view of the apparatus, the gripping members being in the rest position, FIG. 2B is a front view of the apparatus, the gripping members being in the operative position, FIGS. 3A, 3B, 3C, 3D, 3E and 3F are side views of an operating cycle of the apparatus on a given layer of concrete blocks, and FIG. 4 is a perspective view of the pallet formed by operation of the apparatus and the process according to the invention.

Referring to FIG. 1, the apparatus 1 comprises a fixed receiving table 2 on which are disposed products such as concrete blocks (not shown in FIG. 1). The concrete blocks are disposed in successive rows, in order to form a layer. The apparatus 1 also comprises a support structure (not shown) disposed on respective sides of the table. The support structure is provided in its upper part with guide rails 3 in which a movable carriage 4 is slidable. The movable carriage slides with a translatory movement so as to advance continuously during a working cycle. The working cycle comprises making a given number of reserved spaces, for a given layer of products. The movable carriage 4 carries gripping members 5 which co-operate with detection means such as end-of-travel means, cells or proximity detectors mounted on the movable carriage 4. The gripping members 5 also co-operate with a control device which makes it possible to act in particular on the jacks 6 for causing the gripping members 5 to move towards or away from each other, in order to grip or release the concrete blocks.

The guide rails 3 are provided with rack 7 in which there engages a pinion 8 which is driven in rotation by a motor 9. The pinion 8 is carried by the shaft 10 which is fixed with respect to the movable carriage 4. The action of the motor 9 makes it possible for the movable carriage 4 to be translated along the guide rails 3 by means of the pinion 8.

The gripping members 5 comprise holding tongs members 11, 12 and 13, 14. The groups of holding members 11, 12 and 13, 14 move away from each other and are gripped on to the products such as the concrete blocks disposed in layers on the table, under the action of the jacks 6 which are controlled by the detection means.

The guide rails 3 also comprise cams which are shown subsequently in the figures described hereinafter. The cams cooperate with the detection members which are fixed with respect to the movable carriage 4 in order to control the commencement of the operations of gripping and releasing the holding tongs members on the concrete blocks in order to produce predetermined spaces between the rows thereof, such spaces corresponding to the reserved spaces formed in a layer on the pallet which is itself formed by superposed layers of concrete blocks.

Referring to FIG. 2A, the apparatus is shown from the front, with the gripping members formed by the pairs of members 11, 12 and 13, 14 being in a rest position, that is to say, when they do not bear against the concrete blocks 15. The concrete blocks 15 are disposed in layers in the form of two parallel rows, the blocks 15 also following each other directly and without any spacing from each other.

The guide rails 3 carry a C-shaped member 16 in which pairs of cams 17 are disposed. The number of pairs of cams 17 mounted on the guide rails 3 corresponds to the desired number of required spacings between the concrete blocks 15 which are arranged adjacent to each other, in order to form the reserved spaces. The pair of cams 17 therefore comprise two cams which are capable of sliding one with respect to the other, in order to obtain a predetermined width of greater or lesser size, in dependence on the dimensions of the reserved spaces which are to be produced for each row of blocks 15.

As shown in FIG. 2B, the members 11, 12 and 13, 14 are in the operative position. They have been moved into the gripping position for acting on the concrete blocks 15 in order to define a reserved space. The gripping movement is determined by the jacks 6 which are controlled by detection means which are fixed with respect to the movable carriage 4. When the detection means arrive at the position of a side edge of the cams 17, they immediately trigger the commencement of the gripping operation of the members 11, 12 and 13, 14. The movable carriage 4 advances continuously with a translatory movement and, when the detection means arrive at the position of the second edge defining the end of the cams 17, they automatically cause the members 11, 12 and 13, 14 to be moved apart. During the time that the members 11, 12 and 13, 14 are in the gripping position, the movable carriage 4 produces reserved spaces, by entraining the blocks 15 over a predetermined distance.

Referring to FIGS. 3A to 3F, the layer of blocks 15 is shown from the side. The blocks 15 are disposed in rows and are arranged immediately one adjacent the other. The blocks 15 are referenced $B_1$, $B_2$, $B_3$, $B_4$, $B_5$, $B_6$, $B_7$ and $B_8$. FIGS. 3A to 3F show a complete operating cycle of the apparatus 1 and more particularly the carriage 4 for producing reserved spaces on a given layer of blocks 15, which is intended to be palletised.

Figure 3A:
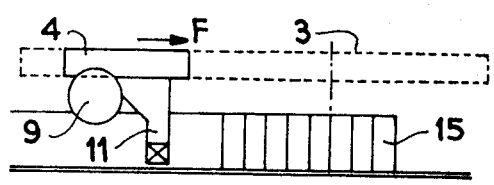

Referring to FIG. 3A, the movable carriage 4 is displaced as indicated by the arrow F by the drive motion of the motor 9 or the like, driving a pinion 8 which engages with a rack 7 as described above. At the commencement of the operating process of the movable carriage 4, the members 11, 12 and 13, 14, only the member 11 being shown in FIG. 3A, are in the spaced-apart position, that is to say, they are disposed on respective sides of the blocks 15 without touching them.

Figure 3B:
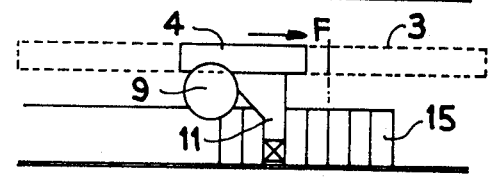

Referring to FIG. 3B, the movable carriage 4 which is moved with a translatory movement as indicated by arrow F arrives at the position of the block referenced $B_3$. The detection means which are fixed with respect to the movable carriage 4 arrive opposite the first edge of the cams 17 described above. The detection means then actuate the members 11, 12 and 13, 14 to grip the blocks referenced $B_3$. At the same time, the movable carriage 4 entrains the blocks $B_4$, $B_5$, $B_6$, $B_7$ and $B_8$, in the direction of arrow F.

Figure 3C:
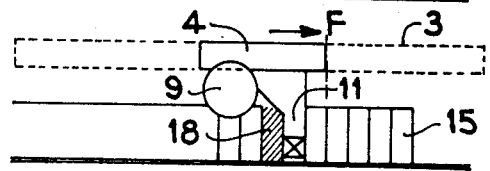

Referring to FIG. 3C, the detection means carried by the movable carriage 4 which is displaced in the direction indicated by arrow F arrive at the position of the second edge defining the end of the cams 17. The detection means then cause the members 11, 12 and 13, 14 to move away from each other, thereby freeing the block 15 referenced at $B_3$. During the gripping operation of the members 11, 12 and 13, 14 on the block $B_3$, the movable carriage 4 has created a space 18 which is of a dimension equivalent to the width of the cams 17.

Figure 3D:
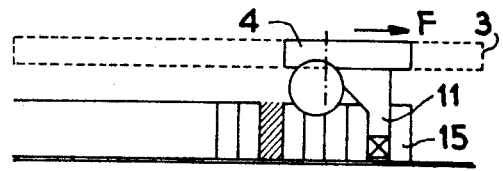

Referring to FIG. 3D, the movable carriage 4 continues its translatory movement along direction F, with the members 11, 12 and 13, 14 being in the rest position, that is to say, spread apart from each other. They arrive at the position of the block referenced $B_7$. The detection means arrive at the position of the first edge of a second group of cams 17 similar to the first group, and cause retraction of the members 11, 12 and 13, 14 in order to grip the block $B_7$.

Figure 3E:
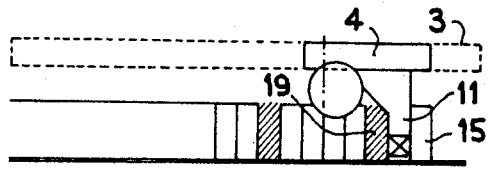

Referring to FIG. 3E, the movable carriage 4 continues its advance movement, gripping the block $B_7$ and pushing the block $B_8$ away to define a second space 19 corresponding to the width of the second group of cams 17.

Having arrived at the position of the second edge of the second group of cams 17, the detection means cause the members 11, 12 and 13, 14 to move apart and thus release the block $B_7$.

Figure 3F:
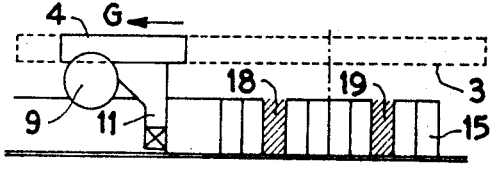

Referring to FIG. 3F, the carriage 4 which has arrived at the end of its movement is returned to its initial position by a rearward translatory movement as indicated by arrow G; during this movement, the members 11, 12 and 13, 14 are in the spaced-apart position.

At the end of this operating cycle, the movable carriage 4 has made it possible to define spaces 18 and 19 in the layer of concrete blocks 15, which spacings correspond to the reserved spaces. The layer 15 formed by the group of blocks referenced $B_1$ to $B_8$ is picked up as a unit by gripping tongs members which palletise this given layer on one or more previously palletised layers.

With this apparatus, it is possible to palletise layers such as those shown in FIG. 3A, then placing upon the first layer a second layer comprising reserved spaces such as those shown in FIG. 3F.

Referring to FIG. 4, the pallet 20 is formed by stacking a plurality of layers 21, 22, 23, 24 and 25. In the particular embodiment, the layer 22 is provided with spaces 18 and 19 which are produced in accordance with the process described above. It is possible to provide a layer with reserved spaces at different levels. It is also possible for complete layers or layers with reserved spaces to be placed one upon the other, combining such layers as required. The various layers 21, 22, 23, 24 and 25 are placed one upon the other in a regular manner or with the layers being crossed in such a manner that the configurations thereof are alternated.

In the precise example shown in this figure, the pallet 20 comprises reserved spaces 18 and 19, the spacing of which corresponds to the thickness of a block 15 in order to receive the fork arms 26 of the lift truck. It is possible nonetheless to envisage different spacings, in dependence on particular requirements.

When the layers 21, 22, 23, 24 and 25 are stacked, they are hooped by means of bands 27.

The pallet 20 is thus finally completed. It comprises moreover two separable stacks 28 and 29.

According to the invention, to form a pallet 20, the concrete blocks are disposed one after the other and per layer on the fixed table of the apparatus; the number of reserved spaces in a given layer of concrete blocks is determined by mounting a number of cams on the guide rails, which corresponds to the number of desired spaces; the dimension of each pair of cams is set to determine the length of the desired spaces, the translatory movement of the movable carriage is controlled so that it performs an operating cycle on a given layer of concrete blocks; the different layers of concrete blocks are formed into a stack, and the stack of concrete blocks is hooped to form a pallet.

I claim:

1. Apparatus for automatic packaging of products such as concrete blocks in pallets formed by stacking layers of said products comprising a fixed receiving table (2), a support structure on respective sides of the table (2), said structure being provided with guide rails (3) in its upper part, a moveable carriage (4) having a slideable translatory movement along the guide rails (3) and carrying gripping members (5) for gripping the products which are disposed successively and in respective layers on the table (2), and detection means co-operating with a control device for causing gripping and release by the gripping members (5) of the products to be packaged, in order to define reserved spaces (18, 19) in a given layer of products, whereby said carriage (4) advances continuously though a single operating cycle forming a given number of reserved spaces (18, 19) in a given layer of products.

2. Apparatus according to claim 1 wherein the guide rails (3) are provided with a rack (7) in which there engages a pinion (8) which is driven in rotation by a motor (9) and carried by a shaft (10) which is fixed with respect to the movable carriage (4) for producing the translatory motion of the carriage (4).

3. Apparatus according to claim 1 wherein the gripping members (5) comprise holding tongs members (11, 12 and 13, 14) which move apart from each other and which grip on to the products disposed on the table (2) under the action of jacks (6) which are controlled by detection means.

4. Apparatus according to claim 1 wherein the detection means comprise cells, end-of-travel means or proximity detectors.

5. Apparatus for automatic packaging of products such as concrete blocks in pallets formed by stacking layers of said products comprising a fixed receiving table (2), a support structure on respective sides of the table (2), said structure being provided with guide rails (3) in its upper part, a moveable carriage (4) having a slideable translatory movement along the guide rails (3) and carrying gripping members (5) for gripping the products which are disposed successively and in respective layers on the table (2), detection means co-operating with a control device for causing gripping and release by the gripping members (5) of the products to be packaged, cams (17) mounted on the guide rails (3) in a fixed relationship with respect to the moveable carriage (4) for cooperating with the detection means to control the commencement of the gripping and release operations of the holding tongs members (11, 12 and 13, 14) on the products in order to produce reserved spaces (18, 19) of predetermined width of greater or lesser size, depending on the desired spacing, between the rows of products corresponding to the reserved spaces.

6. Apparatus according to claim 5 wherein the cams (17) are mounted in pairs, each of the cams being slideable relative to the other to produce a predetermined width of greater or lesser size, in dependence on the desired spacings.

7. Apparatus for automatic packaging of products such as concrete blocks in pallets formed by stacking layers of said blocks comprising a fixed receiving table (2), a support structure on respective sides of the table (2), said structure being provided with guide rails (3) in its upper part, a moveable carriage (4) having a slideable translatory movement along the guide rails (3) and carrying gripping members (5) for gripping the products which are disposed successively and in respective layers on the table (2), and detection means co-operating with a control device for causing gripping and release by the gripping members (5) of the products to be packaged during the continuous advancement of said carriage in the same direction of movement of the carriage in order to define reserved spaces (18, 19) in a given layer of products.

8. Apparatus according to claim 7 wherein said gripping members (5) for gripping the products which are disposed successively and in respective layers on the table (2) are one and the same gripping members being adapted to form said reserved spaces.

* * * * *